(12) United States Patent
Gessenhardt

(10) Patent No.: US 10,961,929 B2
(45) Date of Patent: Mar. 30, 2021

(54) METHOD FOR OPERATING AN INTERNAL COMBUSTION ENGINE, AND INTERNAL COMBUSTION ENGINE

(71) Applicant: Volkswagen Aktiengesellschaft, Wolfsburg (DE)

(72) Inventor: Christopher Gessenhardt, Weferlingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 10 days.

(21) Appl. No.: 16/600,129

(22) Filed: Oct. 11, 2019

(65) Prior Publication Data

US 2020/0040828 A1 Feb. 6, 2020

Related U.S. Application Data

(63) Continuation of application No. PCT/EP2018/058412, filed on Apr. 3, 2018.

(30) Foreign Application Priority Data

Apr. 12, 2017 (DE) .................. 10 2017 206 266.5

(51) Int. Cl.
*F02D 41/00* (2006.01)
*F02B 29/08* (2006.01)
*F02D 41/30* (2006.01)

(52) U.S. Cl.
CPC ............ *F02D 41/008* (2013.01); *F02B 29/08* (2013.01); *F02D 41/3058* (2013.01); *F02D 2200/0411* (2013.01)

(58) Field of Classification Search
CPC ............... F02D 41/008; F02D 41/3058; F02D 2200/0411; F02B 29/08
See application file for complete search history.

(56) References Cited

U.S. PATENT DOCUMENTS 6,600,989 B2 * 7/2003 Sellnau ............... F01L 1/34
123/90.15
6,647,947 B2 11/2003 Boyer et al.
(Continued)

FOREIGN PATENT DOCUMENTS

DE 10306794 A1 5/2004
DE 102011086344 A1 5/2013
(Continued)

OTHER PUBLICATIONS

International Search Report dated Jun. 29, 2018 in corresponding application PCT/EP2018/058412.
(Continued)

*Primary Examiner* — Phutthiwat Wongwian
*Assistant Examiner* — Sherman D Manley
(74) *Attorney, Agent, or Firm* — Muncy, Geissler, Olds & Lowe, P.C.

(57) ABSTRACT

A method for a combustion motor that is initially used in a full Miller cycle or full Atkinson cycle that is advantageous with regard to efficiency. In full operation, a switchover to a partial operation takes place, wherein the intake valves associated with the combustion chambers that are to continue to be operated are switched over to actuation in accordance with a second valve lifting curve in order to achieve a switchover that is as torque-neutral as possible and is optimal with regard to efficiency. The closing time of the intake valve brought about by this second valve lifting curve is designed with respect to maximum volumetric efficiency.

13 Claims, 6 Drawing Sheets

(56) References Cited

U.S. PATENT DOCUMENTS

| | | | |
|---|---|---|---|
| 7,260,467 B2* | 8/2007 | Megli | F02D 13/0215 |
| | | | 701/101 |
| 7,549,283 B2* | 6/2009 | Kerns | F01N 11/007 |
| | | | 60/276 |
| 8,991,346 B2 | 3/2015 | Kinouchi | |
| 9,399,964 B2* | 7/2016 | Younkins | F02D 41/0087 |
| 9,404,396 B2 | 8/2016 | Eppinger et al. | |
| 9,551,288 B2* | 1/2017 | Glugla | F02D 41/008 |
| 9,835,097 B1* | 12/2017 | Schrewe | F02D 41/0002 |
| 9,970,361 B2 | 5/2018 | Haizaki et al. | |
| 10,107,210 B2 | 10/2018 | Heins et al. | |
| 10,302,025 B2* | 5/2019 | Follen | F02D 41/0087 |
| 2006/0037578 A1* | 2/2006 | Nakamura | F01L 1/185 |
| | | | 123/198 F |
| 2007/0233332 A1* | 10/2007 | Kawada | B60K 6/365 |
| | | | 701/13 |
| 2014/0360477 A1* | 12/2014 | Doering | F02D 41/144 |
| | | | 123/673 |
| 2015/0322869 A1 | 11/2015 | Shost et al. | |
| 2016/0146120 A1* | 5/2016 | Kawaguchi | F01L 1/267 |
| | | | 123/559.2 |
| 2016/0160701 A1* | 6/2016 | Choi | F01L 13/0005 |
| | | | 123/90.16 |

FOREIGN PATENT DOCUMENTS

| | | |
|---|---|---|
| DE | 102012004419 A1 | 9/2013 |
| DE | 102012017275 A1 | 3/2014 |
| DE | 102013223112 A1 | 6/2014 |
| DE | 102015112196 A1 | 2/2016 |
| DE | 112015000165 T5 | 6/2016 |
| DE | 102016209957 A1 | 12/2017 |
| FR | 3014489 A1 | 6/2015 |
| WO | WO2017005445 A1 | 1/2017 |

OTHER PUBLICATIONS

Rudolf Flierl et al, "Mechanisch Vollvariabler and Zylinderabschaltung" MTZ-Motortechnische Zeitschrift, Springer. vol. 74, No. 4, Apr. 1, 2013, pp. 334-341 DOI: 10.1007/S35146-013-0082-X.

* cited by examiner

METHOD FOR OPERATING AN INTERNAL COMBUSTION ENGINE, AND INTERNAL COMBUSTION ENGINE

This nonprovisional application is a continuation of International Application No. PCT/EP2018/058412, which was filed on Apr. 3, 2018, and which claims priority to German Patent Application No. 10 2017 206 266.5, which was filed in Germany on Apr. 12, 2017, and which are both herein incorporated by reference.

BACKGROUND OF THE INVENTION

Field of the Invention

The present invention relates to a method for operating an internal combustion engine comprising a reciprocating internal combustion motor that can be operated in partial operation.

Description of the Background Art

Multicylinder reciprocating internal combustion engines are known that can be operated temporarily in so-called partial operation, in which a portion of the combustion chambers are deactivated so that no thermodynamic cycles are carried out therein. Instead, the pistons associated with the deactivated combustion chambers are carried along by the pistons of the combustion chambers that continue to be active. This takes place with the goal of an efficiency improvement for the operation of the internal combustion engines, because a deactivation of a portion of the combustion chambers with essentially constant drive power results in operation of the remaining active combustion chambers at considerably higher load, which is associated with a higher specific efficiency of the thermodynamic cycles performed in these combustion chambers. In order to attain the smallest possible decrease in the efficiency improvement achievable for the active combustion chambers as a result of carrying along the pistons of the deactivated combustion chambers, provision is normally made to keep the gas-exchange valves associated with the deactivated combustion chambers closed during partial operation, as a result of which the gas located within these combustion chambers is cyclically compressed and expanded, but is not expelled. A power loss resulting from compression of gas quantities that would subsequently have been expelled through opened exhaust valves can be avoided in this way.

In order to achieve maximum drive comfort for a motor vehicle driven by such an internal combustion engine, a switchover between the operating modes (full operation and partial operation) should be realized in as torque-neutral a manner as possible, and thus without jerking of the drive. For this purpose, it is necessary to compensate, in as optimally matched a manner as possible, for the decreasing load with which the combustion chambers to be deactivated are operated during the switchover by means of an increasing loading with which the combustion chambers that continue to be actively operated are operated.

From DE 10 2011 086 344 A1, an internal combustion engine comprising a combustion motor having two cylinder banks is known in which the combustion chambers of one of the cylinder banks can be deactivated for a partial operation. In this design, provision is made to deactivate these combustion chambers sequentially in order to achieve as torque-neutral a switchover as possible from a full operation, in which both cylinder banks are in the activated state, to the partial operation.

DE 10 2012 017 275 A1 also describes a reciprocating internal combustion engine comprising multiple cylinders of which some can be deactivated for the purposes of a partial operation. In order to be able to realize as torque-neutral a switchover as possible from a full operation to a partial operation, provision is made for the switchover that a compressor that is switchable, in particular driven by an electric motor, is briefly activated during a throttling, occurring over multiple cycles, of the combustion chambers to be deactivated in order to increase the charging of the combustion chambers that are to continue to be actively operated.

DE 10 2012 004 419 A1 discloses a valve actuating mechanism for a combustion motor of a motor vehicle, wherein the combustion motor can be operated in full operation as well as in partial operation. To switch over from full operation into partial operation, provision is made that the intake valves associated with the combustion chambers that are to be switched off are switched over from an actuation by means of a first cam to a (non)actuation by means of a null cam whereas the intake valves associated with the combustion chambers that are to continue to be actively operated are switched over from an actuation by means of a first cam to an actuation by means of a second cam. In this design, the two cams differ with regard to the valve lift achieved by the same.

From the as yet unpublished German patent application 10 2016 209 957.4, a method is known for operating an internal combustion engine comprising a combustion motor that forms at least two combustion chambers, which are delimited by cylinders formed in a cylinder housing and by pistons that are guided cyclically up and down therein, and in which thermodynamic cycles can be performed during operation of the internal combustion engine, wherein a gas exchange in the combustion chambers is then controlled by means of at least one intake valve apiece and at least one exhaust valve apiece, which are actuated by means of cams, and wherein a first operating state (full operation) is provided, in which the thermodynamic cycles are performed in a first combustion chamber as well as in a second combustion chamber, and a second operating state (partial operation) is provided, in which the thermodynamic cycles are performed in the first combustion chamber and the thermodynamic cycles are not performed in the second combustion chamber, wherein, for a switchover from the first operating state to the second operating state, a change is made from a use of a first intake cam to the use of a second intake cam for actuation of the intake valve associated with the first combustion chamber. Moreover, at least the intake valve associated with the first combustion chamber is closed before BDC [bottom dead center] (in particular before BDC−60° crankshaft angle for achieving a full Miller cycle) or after BDC (in particular after BDC+100° crankshaft angle for achieving a relevant full Atkinson cycle) in the case of an actuation by means of the first intake cam, and is closed closer to BDC by means of the second intake cam.

The changeover between the intake cams through which the intake valve associated with the first combustion chamber is alternately actuated on account of a switchover between the operating modes is carried out with the goal of a temporary increase in the volumetric efficiency, which is to say the ratio of the mass of fresh gas actually contained in the combustion chamber after conclusion of a gas exchange to the maximum theoretically possible mass, in order to implement a maximally torque-neutral switchover from a full operation to a partial operation without needing to accept a degradation of the efficiency due to substantial changes in the ignition angle.

In the method according to 10 2016 209 957.4, provision can additionally be made that, after the switchover from the first operating state to the second operating state, the timing for the intake valve associated with the first combustion chamber is adjusted in the early direction if an intake closure before BDC was provided for the first operating state, or is adjusted in the late direction if an intake closure after BDC was provided for the first operating state.

In summary, provision can accordingly be made in the method according to 10 2016 209 957.4 that the combustion motor is initially used in a full Miller cycle or full Atkinson cycle that is advantageous with regard to efficiency. Proceeding from such a full operation, a switchover to a partial operation takes place, wherein the intake valves associated with the combustion chambers that are to continue to be operated are switched over to actuation by means of a second intake cam in order to achieve a switchover that is as torque-neutral as possible on the one hand and is optimal with regard to efficiency on the other hand, wherein the closing time of the intake valve brought about by this second intake cam is designed with respect to maximum volumetric efficiency. Since such a closing time of the intake valve is accompanied by an increased risk of knocking, provision is made to adjust the timing of the intake valve by means of a phase shifter shortly after the switchover to the second intake cam and preferably simultaneously with an increase in the pressure in an intake manifold of the combustion motor, either in the early direction again (to achieve a partial Miller cycle) if a full Miller cycle was also provided previously, or in the late direction again (to achieve a partial Atkinson cycle) if a full Atkinson cycle was also provided previously.

This procedure results in the problem that, based on the relatively limited adjustment range of conventional phase shifters, the earliest closing times (in a full Miller cycle) or latest closing times (in a full Atkinson cycle) that are fundamentally permitted by the phase shifter cannot be used for the full Miller or Atkinson cycle immediately preceding the switchover, since a defined adjustment range must be reserved for the partial operation provided after the switchover in accordance with the same operating method (Miller or Atkinson) that previously was also provided in full operation. However, if the earliest closing times (in a full Miller cycle) or latest closing times (in a full Atkinson cycle) that are fundamentally permitted by the phase shifter are not utilized before the switchover, the advantage with regard to efficiency that can be achieved during the switchover between the operating modes through the increase in volumetric efficiency by the changeover to the second intake cam is reduced, which consequently is accompanied by a reduced efficiency in the operation of the combustion motor during the switchover.

SUMMARY OF THE INVENTION

It is therefore an object of the present invention to realize in an internal combustion engine, in the simplest way possible, as torque-neutral a switchover as possible from full operation to partial operation simultaneously with the greatest possible efficiency in operation of the internal combustion engine.

The invention, like the method according to 10 2016 209 957.4, which is incorporated herein by reference, is based on the idea of achieving as torque-neutral a switchover as possible from a full operation to a partial operation of an internal combustion engine comprising a multi-cylinder combustion motor in that the torque component being lost due to the deactivation of the cylinder or cylinders provided for this purpose is offset by the combustion chamber or chambers that are to continue to be actively operated by means including at least that the volumetric efficiency, which is to say the ratio of the mass of fresh gas actually contained in the combustion chambers after conclusion of a gas exchange to the maximum theoretically possible mass, is increased for these combustion chambers and, in particular, is set to the maximum to the greatest extent possible, during the switchover. As a result, the amount of fuel that can be transferred into the combustion chambers of the combustion chambers that are to continue to be actively operated, and thus the drive torque they generate, can be increased independently of an intake manifold pressure increase. An increase in the volumetric efficiency is especially advantageous in that it can be implemented relatively rapidly, especially in comparison with an increase in the intake manifold pressure (especially when a relatively inexpensive exhaust-gas turbocharger is used), by adjusting the timing of the intake valves of the combustion chambers that are to continue to be actively operated. An especially rapid adjustment of the valve timing can be achieved in this case through a changeover of the cams actuating these intake valves by means of an appropriate switchover device such as can also be provided, in particular, for the deactivation of the gas exchange valves of the combustion chambers to be deactivated.

Accordingly, a method for operating an internal combustion engine is provided, wherein the internal combustion engine includes at least one combustion motor, preferably a spark-ignition motor, in particular an Otto cycle motor, that forms at least two combustion chambers, which are delimited by cylinders formed in a cylinder housing and by pistons that are guided therein, and in which thermodynamic cycles can be performed during operation of the internal combustion engine, wherein a gas exchange in the combustion chambers is then controlled by means of at least one intake valve apiece and at least one exhaust valve apiece, which preferably are actuated by means of cams, and wherein a first operating state is provided, in which the thermodynamic cycles are performed in a first of the combustion chambers as well as in a second of the combustion chambers (full operation), and a second operating state is provided, in which the thermodynamic cycles are performed in the first combustion chamber and the thermodynamic cycles are not performed in the second combustion chamber (partial operation), in that at least a delivery of fuel to the second combustion chamber is stopped and/or an ignition of fuel is prevented and, moreover, preferably the intake and exhaust valves associated with the second combustion chamber are not actuated and thus are kept closed.

Provision is made here that, for a switchover from the first operating state to the second operating state, a change is made from a use of a first valve lifting curve, which preferably is applied by means of a first intake cam, to the use of a second valve lifting curve, which preferably is applied by means of a second intake cam, for actuation of the intake valve associated with the first combustion chamber.

In order to be able to advantageously achieve an increase in the volumetric efficiency through a changeover of the valve lifting curves for the intake valve associated with the first combustion chamber that is also actively used in the second operating state, provision is further made that the volumetric efficiency for this combustion chamber (and preferably also for the second combustion chamber) is not the highest possible in the first operating state, by the means that a relatively early (i.e., significantly before BDC) or a relatively late (i.e., significantly after BDC) intake closure is provided for the intake valve(s) associated with this combustion chamber/these combustion chambers (BDC: bottom dead center of piston movement). Such a procedure can be provided regularly in modern internal combustion engines, and is known as Miller cycle (for relatively early intake closure) or Atkinson cycle (for relatively late intake closure). This procedure makes it possible to achieve a relatively high efficiency when operating an internal combustion engine with low to moderate loads as a result of a relatively strongly pronounced expansion of the relatively small amount of the gas enclosed in the combustion chambers during the operating cycle. Provision is therefore made that at least the intake valve associated with the first combustion chamber is closed before BDC, preferably before BDC−60° crankshaft angle, or after BDC, preferably after BDC+100° crankshaft angle, in the case of actuation by means of the first valve lifting curve. Because a switchover from full operation to partial operation of the internal combustion engine oftentimes is reasonably possible only when the internal combustion engine has previously (in full operation) been operated essentially in a steady-state manner with low to moderate loads, it is fundamentally also reasonable to operate it according to a Miller or Atkinson cycle in order to achieve a best possible efficiency in this (full) operation. According to the invention, in contrast, after a switchover to partial operation the volumetric efficiency in the first combustion chamber that continues to be actively operated should be increased as compared to full operation in order to at least partially offset the loss of the drive power of the second combustion chamber. In particular, provision can be made for this purpose to achieve the highest possible volumetric efficiency, wherein it may if applicable be necessary to take into account limitations, such as the avoidance of knocking for example. To this end, provision is made within the scope of the method according to the invention that in the partial operation of the internal combustion engine, and accordingly in the case of actuation in accordance with the second valve lifting curve, at least the intake valve associated with the first combustion chamber is (at least initially) closed with closing times that are closer to BDC as compared with the preceding full operation. In particular, provision can be made that the intake valve associated with the first combustion chamber is then closed in the range between BDC±45° crankshaft angle, preferably BDC±40° crankshaft angle, and especially preferably between BDC±30° crankshaft angle.

In order to prevent the shifting in the closing time caused by the switchover between the two (different) valve lifting curves for the intake valve from affecting the opening time for the intake valve associated with the first combustion chamber to the same degree, provision can preferably be made that the width of the second valve lifting curve as compared to the width of the first valve lifting curve is greater if an intake closure before BDC was provided for the first operating state, or is smaller if an intake closure after BDC was provided for the first operating state.

In this way, an unwanted shifting of the opening time for the intake valve associated with the first combustion chamber can be prevented. In particular, provision can be made that the opening time for this intake valve caused in accordance with the second valve lifting curve corresponds as exactly as possible, or substantially, to the opening time caused by the first valve lifting curve (e.g., a maximum difference of ±10° crankshaft angle).

The maximization provided according to the invention of the volumetric efficiency for the first combustion chamber for a switchover from full operation to partial operation that is as torque-neutral as possible and at the same time is optimal with regard to efficiency may be associated with a sharply increased tendency of this combustion chamber to knock, which is fundamentally undesirable because this necessitates countermeasures preventing a knocking that generally have an adverse effect on efficiency. For a relatively long-duration partial operation that follows the switchover, provision is therefore made according to the invention that, after the switchover from the first operating state to the second operating state, the timing for the intake valve associated with the first combustion chamber is adjusted, by means of a phase shifter, (further) in the late direction (preferably to at least BDC+25° crankshaft angle and further preferred to approximately or at most BDC+55° crankshaft angle) if an intake closure before BDC (Miller cycle) was provided for the first operating state, or (further) in the early direction (preferably to at least BDC−20° crankshaft angle and further preferred to approximately or at most BDC−55° crankshaft angle) if an intake closure after BDC (Atkinson cycle) was provided for the first operating state.

In summary, provision is made in a method according to the invention that the combustion motor is initially used in a full Miller cycle or full Atkinson cycle that is advantageous with regard to efficiency. Proceeding from such a full operation, a switchover to a partial operation takes place, wherein the intake valves associated with the combustion chambers that are to continue to be operated are switched over to actuation in accordance with a second valve lifting curve in order to achieve a switchover that is as torque-neutral as possible on the one hand and is as optimal with regard to efficiency as possible on the other hand, wherein the closing time of the intake valve brought about by this second valve lifting curve is designed with respect to maximum volumetric efficiency (as far as practical). Since such a closing time of the intake valve is accompanied by an increased risk of knocking, provision is made to adjust the timing of the intake valve by means of the phase shifter shortly or immediately after the switchover to the second intake cam and preferably simultaneously with an increase in the pressure in an intake manifold of the combustion motor, either further in the late direction (to achieve a partial Atkinson cycle) if a full Miller cycle was provided previously, or further in the early direction (to achieve a partial Miller cycle) if a full Atkinson cycle was provided previously.

By this means, it is possible to achieve the result that the earliest closing times (in a full Miller cycle) or latest closing times (in a full Atkinson cycle) that are fundamentally permitted by the phase shifter can be used for the full Miller or Atkinson cycle immediately preceding the switchover, because the phase shifter can be adjusted starting from one of its end positions toward the respective other end position for the operating method changeover provided according to the invention (full Miller cycle to partial Atkinson cycle or full Atkinson cycle to partial Miller cycle) through a switchover from full operation to partial operation, for which purpose the entire adjustment range of the phase shifter can then be available. As a result, full use can be made of the earliest closing times (in a full Miller cycle) or latest closing times (in a full Atkinson cycle) that are permitted by the phase shifter so that it is possible at the same time to maximize the advantage with regard to efficiency that can be achieved during the switchover between the operating modes through the increase in volumetric efficiency by the changeover to the second valve lifting curve, which consequently can be accompanied by a degree of efficiency that is as optimal as possible in the operation of the combustion motor during the switchover, since a delay in the ignition timing that adversely affects the efficiency prior to the switchover from full operation to partial operation with the goal of a torque adjustment can be kept relatively small or even avoided completely.

An internal combustion engine according to the invention that includes at least one combustion motor that forms at least two combustion chambers, which are delimited by cylinders formed in a cylinder housing and by pistons that are guided therein, and in which thermodynamic cycles can be performed during operation of the internal combustion engine, wherein a gas exchange in the combustion chambers can be controlled by means of an intake valve apiece and an exhaust valve, which preferably are actuated by means of cams, and wherein two (different) valve lifting curves (which preferably are applied by means of intake cams), it being possible to switch between their use by means of a switchover device, as well as a phase shifter are provided for the intake valve associated with a first combustion chamber, is characterized by a control device that is programmed such that it can carry out a method according to the invention.

An increase in the volumetric efficiency provided for the combustion chamber that continues to be actively operated for a switchover from a full operation to a partial operation of an internal combustion engine can be applied fundamentally independently of a possible adjustability of the pressure in an intake manifold of the internal combustion engine, such as can be achieved through a supercharging, for example. The internal combustion engine according to the invention can thus fundamentally also be a non-supercharged internal combustion engine, which is to say one in which the combustion motor is designed as a so-called naturally aspirated engine. Preferably however, provision can be made that the pressure in an intake manifold of the internal combustion engine is increased, especially immediately after the switchover from the first operating state to the second operating state, so that a compensation for the component of the drive power being lost as a result of the deactivation of one or more combustion chambers in partial operation is not achieved solely through an increase in the volumetric efficiency for the combustion chamber or chambers that are to continue to be actively operated, but instead also through an increase in the combustion chamber charge resulting from an increased intake manifold pressure, and thus through the possibility of a transfer of greater quantities of fuel.

An internal combustion engine according to the invention can accordingly have means for increasing the pressure in an intake manifold of the internal combustion engine. These means can be, in particular, a compressor integrated into an intake system of the internal combustion engine. Especially preferably, the compressor can be part of an exhaust-gas turbocharger, which, moreover, also has a turbine integrated into an exhaust system of the internal combustion engine, by which means the compressor can be driven. Such an exhaust-gas turbocharger can also be provided with a device for variable turbine flow (VTG), which makes possible a relatively fast and effective influencing of the pressure in the intake manifold of the internal combustion engine.

An "intake manifold" is understood to be the last section of the intake system of the internal combustion engine, in which the fresh gas flow is divided into subflows that are fed to the individual combustion chambers of the combustion motor, for which purpose the intake manifold forms a number of gas passages corresponding to the number of combustion chambers of the combustion motor.

A device for variable turbine flow (VTG) can include, in a known way, a multiplicity of guide vanes arranged in an intake of a turbine of the exhaust-gas turbocharger that are designed to be individually rotatable, wherein they are jointly adjustable by means of an adjusting device. As a function of their angular positions, these guide vanes constrict the free flow cross section of the intake of the turbine to a greater or lesser degree and also influence the section of the primary inflow of the turbine rotor and the orientation of this inflow.

An influencing of the pressure in the intake manifold of the internal combustion engine starting from an initial value provided for full operation will generally require a relatively long period of time before reaching a target value provided for partial operation, which period of time can, in particular, also be significantly longer than the period of time needed for a switchover from the first valve lifting curve to the second valve lifting curve for the intake valve associated with the first combustion chamber. However, this is unproblematic in a method according to the invention because in order to achieve a switchover from full operation to partial operation that is as torque-neutral as possible and at the same time is as optimal with regard to efficiency as possible, the very rapidly achievable switchover between the two valve lifting curves with the goal of a short-term maximization of volumetric efficiency is provided initially, which can then be followed by a continuous increase in the intake manifold pressure, by which means a complementary adjustment of the timing of the intake valve associated with the first combustion chamber by means of the phase shifter is made possible (thus again bringing about a reduction in the volumetric efficiency), so that the gradual increase in the intake manifold pressure and the adjustment of the valve timing simultaneously taking place can offset one another with regard to the effect on the torque produced by the combustion motor. As a result, torque neutrality is achieved not only at the time of the changeover between the valve lifting curves, but also over the entire switchover from full operation to partial operation as a whole. Consequently it is possible according to the invention to provide, in particular, that an increase in the volumetric efficiency due to the switchover from the first valve lifting curve to the second valve lifting curve is achieved that is greater than is provided for an operation after an initial phase during which the effect of an increase of the pressure in the intake manifold is not yet fully realized. Starting from this initially relatively large increase in the volumetric efficiency, an essentially constant drive torque during the initial phase and beyond can then be achieved through a suitable change in the timing for the intake valve associated with the first combustion chamber, by which means the volumetric efficiency is reduced again to a certain extent and in the opposite direction from the increase of the pressure in the intake manifold.

It may be necessary under certain circumstances to set the ignition angle for at least the first combustion chamber relatively late prior to the switchover even in a procedure in accordance with the method according to the invention in order to achieve a desired torque adjustment and, in particular, torque reduction (as a result of a diminished efficiency) in preparation for the switchover. In this case it can be useful to adjust the ignition angle for the first combustion chamber, which was previously set relatively late, in the early direction for the switchover and, in particular, simultaneously with the switchover from the first operating state to the second operating state, so that a maximization of not only the volumetric efficiency but also of the efficiency is achieved immediately upon the switchover.

Because an increase in the volumetric efficiency that is as extensive as possible is to be realized through the switchover from the first valve lifting curve to the second valve lifting curve for the intake valve associated with the first combustion chamber, this can have the effect that the combustion processes that take place as part of the thermodynamic cycle in this combustion chamber briefly approach the knock threshold or that the knock threshold could even be crossed in the absence of countermeasures. In order to avoid this, according to a preferred embodiment of a method according to the invention in which an ignition angle was provided that was set relatively late before the switchover and was adjusted in the early direction for the switchover, provision can be made that the ignition angle is adjusted back in the late direction subsequent to the early adjustment following the switchover from the first operating state to the second operating state, in order to (additionally) reduce the risk of knocking.

To achieve a partial operation of the internal combustion engine that is as advantageous as possible, provision can be made in a preferred embodiment of a method according to the invention that a valve overlap, which is to say a simultaneous opening of the intake and exhaust valves associated with the first combustion chamber, is adjusted for a switchover from the first operating state to the second operating state. This can be achieved, in particular, by the means that at least the exhaust closure or the exhaust timing as a whole (i.e., additionally the exhaust opening as well) for the corresponding exhaust valve is adjusted in the early or late direction, for example by an amount between 0° crankshaft angle and 20° crankshaft angle.

Such an adjustment of the exhaust timing can likewise be accomplished by means of a phase shifter through which a phase position of the exhaust cam or cams, if applicable by means of a camshaft as a whole that integrates the exhaust cam or cams, can be rotated with respect to a drive wheel that brings about a rotation of the exhaust cam or cams. An internal combustion engine according the invention can accordingly also have a phase shifter for changing the timing for the exhaust valve associated with the first combustion chamber and/or the second combustion chamber. Since such phase shifters generally operate relatively sluggishly, however, provision can be made in a preferred embodiment of the method according to the invention that a change is made from a use of a first exhaust cam to the use of a second exhaust cam for actuation of the exhaust valve associated with the first combustion chamber in order to achieve an appropriate adjustment of the exhaust timing. In this case, provision can be made, in particular, that the second exhaust cam causes a relatively late exhaust closure as compared to the first exhaust cam when an intake closure before BDC, which is to say a Miller cycle, was provided for the first operating state, or causes a relatively early exhaust closure when an intake closure after BDC, which is to say an Atkinson cycle, was provided for the first operating state. For this purpose, an internal combustion engine according to the invention can include at least two exhaust cams for the exhaust valve associated with the first combustion chamber, wherein it is possible to switch between their use by means of a switchover device.

The subject matter of the invention is also a control device with a memory, wherein a computer program is stored in the memory, the execution whereof makes it possible to carry out a method according to the invention.

The invention additionally relates to a computer program with a program code for carrying out a method according to the invention when the computer program is executed on a computer.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
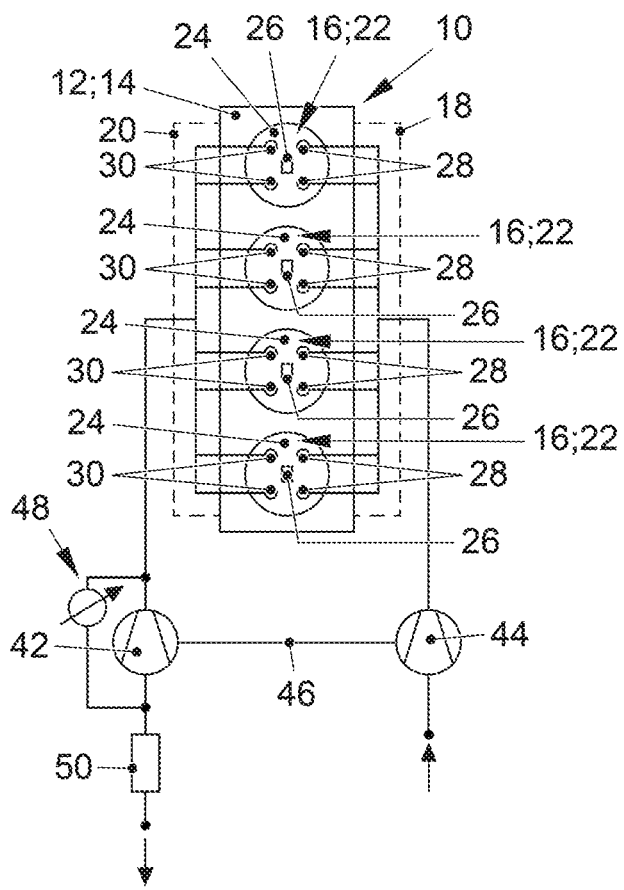
FIG. 1 shows an internal combustion engine according to the invention in a schematic representation.

Schematically shown in FIG. 1 is an internal combustion engine according to the invention. A motor vehicle, for example, can be driven by means of the internal combustion engine.

Figure 2:
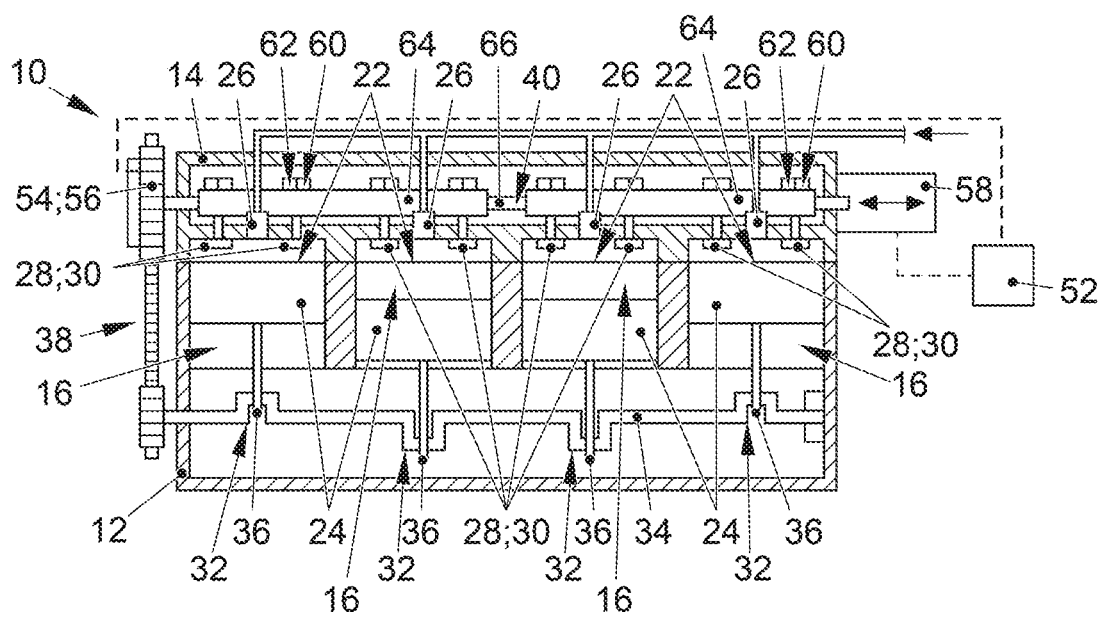
FIG. 2 shows the combustion motor of the internal combustion engine from FIG. 1 in a schematic longitudinal section.

The internal combustion engine includes a combustion motor 10, which is also shown in further detail in FIG. 2, and which can, in particular, be operated with a four-stroke cycle. The combustion motor 10 forms several (here: four) cylinders 16 in a unit formed of engine block 12 and cylinder head 14. The cylinders 16 are connected in a gas-carrying manner on the intake side to an intake manifold 18 of an intake system and on the exhaust side to an exhaust manifold 20 of an exhaust system of the internal combustion engine. In a known manner, fresh gas (essentially air) is burned with fuel in combustion chambers 22 that are delimited by the cylinders 16 together with pistons 24 guided therein and the cylinder head 14. The fuel can be injected directly into the combustion chambers 22 for this purpose by means of injectors 26. The exhaust gas produced in the combustion of the fuel/fresh gas mixture is carried away through the exhaust system.

The delivery of fresh gas into the combustion chambers 22 and the removal of the exhaust gas from the combustion chambers 22 is controlled by means of four gas exchange valves, namely two intake valves 28 and two exhaust valves 30 per combustion chamber 22, which are actuated by a valve actuating mechanism of the combustion motor 10 that is not shown in FIG. 1. The valve actuating mechanism includes, according to FIG. 2, a crankshaft 34 forming crankshaft journals 32, wherein the crankshaft journals 32 are connected to the pistons 24 by connecting rods 36. In this way, linear motions of the pistons 24 are converted into a rotation of the crankshaft 34, wherein the rotation of the crankshaft 34 in turn causes a periodic reversal of direction of the linear motions of the pistons 24. The rotation of the crankshaft 34 is also transmitted through a control mechanism, for example a toothed belt drive 38, to two camshafts 40, each of which actuates two gas exchange valves 28, 30 per combustion chamber 22 through, for example, rocker arms or cam followers (not shown). One of the camshafts 40 is implemented as an intake camshaft, i.e., it actuates all intake valves 28, while the other is implemented as an exhaust camshaft, and consequently actuates all exhaust valves 30.

The internal combustion engine additionally includes an exhaust gas turbocharger. This has a turbine 42 integrated into the exhaust system and a compressor 44 integrated into the intake system. A rotor of the turbine 42 driven in rotation by the exhaust gas stream drives a rotor of the compressor 44 through a shaft 46. The rotation of the rotor of the compressor 44 thus brought about compresses the fresh gas routed through it. Boost pressure limitation can be accomplished by means of a wastegate 48 by routing a portion of the exhaust gas stream around the turbine 42 in operation of the combustion motor 10 at high speeds and/or loads. In addition, an exhaust gas treatment device 50, for example in the form of a three-way catalytic converter, is integrated into the exhaust system.

The combustion motor 10 additionally includes a phase shifter 54 for each of the camshafts 40; said phase shifters are controlled by a control device 52 (engine control unit). The phase shifters 54 make it possible to change, and concretely to move, the timing and thus the opening phases of the associated gas exchange valves 28, 30. The phase shifters 54 are each integrated into a gear wheel 56 of the camshafts 40 in a known manner (see, for example, DE 10 2013 223 112 A1). Accordingly, the phase shifters 54 of the camshafts 40 can each have a vane rotor (not shown) that is connected in a rotationally fixed manner to the relevant camshaft 40 and in each case is arranged to be rotatable within limits inside a stator (not shown) of the phase shifter 54. The stator forms a tooth contour on its cylindrical outer surface for the engagement of teeth of a toothed belt of the toothed belt drive 38. Formed between the vane rotor and the stator of the phase shifters 54 can be multiple pressure chambers, which can be selectively filled with a fluid, in particular an oil, under the control of a phase shifter valve (not shown) in order to rotate the vane rotor inside the stator in a defined manner, by which means the phase angle between the applicable camshaft 40 connected to the vane rotor and the stator connected to the crankshaft 34 in a rotary driving manner can be changed in accordance with the goal of a change in the timing of the associated gas exchange valves 28, 30.

Moreover, the internal combustion engine also includes a switchover device 58, by means of which it is possible to switch from an actuation by means of a first cam 60 to an actuation by means of a second cam 62 for the intake valves 28 as well as the exhaust valves 30. This switchover device 58 can likewise be controlled by the control device 52, and is indicated only schematically in FIG. 2. The function of the switchover device 58 is based on a movability along a longitudinal axis of sleeve-like cam carriers 64 (see also FIG. 3), which are arranged in a rotationally fixed manner on a base shaft 66, by means of one switchover actuator 68 (see FIG. 4) apiece, wherein the cam carriers 64 have two different cams 60, 62 for each of the intake valves 28 and exhaust valves 30 that they can actuate (see FIG. 3 and FIG. 4), which cams interact alternately, as a function of the movement positions of the cam carriers 64 that have been set, with the associated intake valves 28 and exhaust valves 30.

Figure 3:
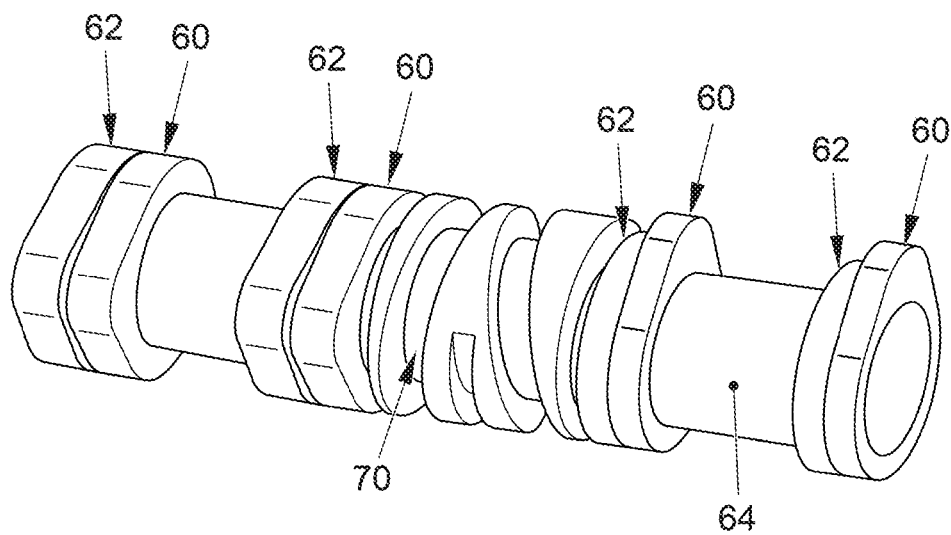
FIG. 3 shows a cam carrier for a combustion motor according to FIG. 1.
Figure 4:
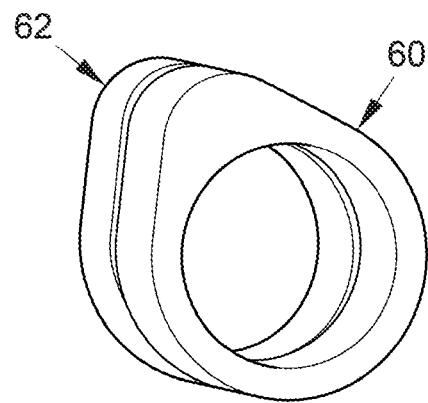
FIG. 4 shows a cam pair of the cam carrier according to FIG. 3.
Figure 5:
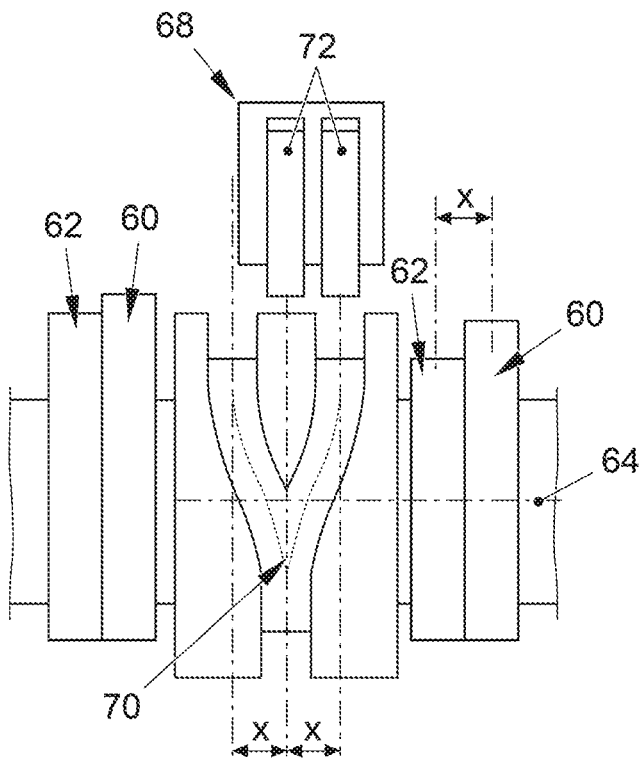
FIG. 5 shows a portion of the cam carrier from FIG. 3 and a switchover actuator in a schematic representation.

In the exemplary embodiment as is shown in FIGS. 2 and 3, each of the cam carriers 64 includes a total of four cam pairs, each of which is associated with a gas exchange valve 28, 30 of the internal combustion engine. Thus, either the intake valves 28 or the exhaust valves 30 of a total of two adjacent cylinders 16 of a combustion motor 10 according to FIGS. 1 and 2, in which two intake valves 28 and two exhaust valves 30 are associated with each cylinder 16, are actuated by means of the cams 60, 62, which are formed by such a cam carrier 64. Moreover, the cam carrier 64 shown in FIG. 3 also forms a shift gate in the form of a Y-shaped guide slot 70 between the two cam pairs associated with the gas exchange valves 28, 30 of a first cylinder 16 and the two cam pairs associated with the gas exchange valves 28, 30 of a second cylinder 16. By means of an interaction of this guide slot 70 with drivers 72 of the associated switchover actuator 68, the cam carrier 64 can be moved axially by the distance x, and thus a selected cam 60, 62 of each cam pair can be brought into operative connection with the associated gas exchange valve 28, 30 in each case. For this purpose, starting, for example, from the functional setting shown in FIG. 5, in which each of the gas exchange valves 28, 30 stands in operative connection with the right (first) cam 60 of each cam pair, the right driver 72 can be extended, thus moving the cam carrier 64 to the right by the distance x in interaction with its rotation (upward in FIG. 5). As a result of the running out of the Y-shaped guide slot 70 in the central section, at the bottom in FIG. 5, the right driver 72 is moved back into the retracted position in this process. After such a movement of the cam carrier 64 by the distance x, each of the left (second) cams 62 of each cam pair is then in operative connection with the associated gas exchange valve 28, 30. Such a movement of the cam carrier 64 to the right by the distance x also has the result that the left driver 72 has been brought into engagement with the left section of the Y-shaped guide slot 70, so that by extending this driver 72, the cam carrier 64 can again be moved left by the distance x.

Provision is made that for a partial operation of the internal combustion engine, a subset, and in particular half, of the combustion chambers 22, specifically the two middle combustion chambers 22, can be deactivated in that a supply of fuel to the associated injectors 26 is stopped and the gas exchange valves 28, 30 associated therewith are no longer actuated, which is to say are opened. For this purpose, provision is made that each cam pair that is associated with the gas exchange valves 28, 30 of such a deactivatable combustion chamber 22 forms a second cam 62 in the form of a so-called null cam that has no cam lift and thus does not bring about an opening of a gas exchange valve 28, 30 associated therewith. In the case of the cam carrier 64 from FIG. 3, the left cams 62 of each of the two cam pairs located to the right of the guide slot 70 are designed as corresponding null cams.

In the case of a switchover from a full operation of the internal combustion engine, in which all of the combustion chambers 22 are operated with low to moderate loads, to such a partial operation, half of the combustion chambers 22 are deactivated in a very short period of time that corresponds approximately to one rotation of the crankshaft 34, and thus can no longer contribute to generation of a drive power by the combustion motor 10. On the contrary, since the pistons 24 associated with these combustion chambers 22 must be carried along by the pistons 24 of the combustion chambers 22 that continue to be actively operated, these deactivated combustion chambers 22 change their function from that of a power producer to a power consumer.

Because such a switchover from full operation to partial operation is intended to take place regularly in a constant operating phase of the internal combustion engine, therefore the drive power before and after the switchover should then also remain essentially constant. Consequently, the loss of the deactivated combustion chambers 22 must be compensated for by the combustion chambers 22 that continue to be actively operated. The load at which these are operated after a switchover must be increased considerably for this purpose, and in particular approximately doubled. To this end, a considerably larger quantity of fuel must be transferred within one cycle of the thermodynamic cycles performed in the combustion chambers 22 that continue to be actively operated, for which purpose a quantity of fresh gas that is increased approximately commensurately is required.

This increased quantity of fresh gas should be achieved on the one hand by an increase in the pressure in the intake manifold 18 through conventional measures of boost pressure regulation of the exhaust gas turbocharger. As a result of a higher compression of the fresh gas, more fresh gas can then be introduced into the combustion chambers 22 so that a correspondingly increased quantity of fuel can also be transferred.

Furthermore, provision is made that the volumetric efficiency, and thus the ratio of the masses of fresh gas actually contained in the combustion chambers 22 after conclusion of a gas exchange to the maximum theoretically possible masses, is also increased and, in particular, is maximized. The two measures in combination bring about a marked increase in the quantity of fresh gas provided within one cycle to the combustion chambers 22 that continue to be actively operated in partial operation in comparison with the full operation preceding the switchover.

Figure 6:
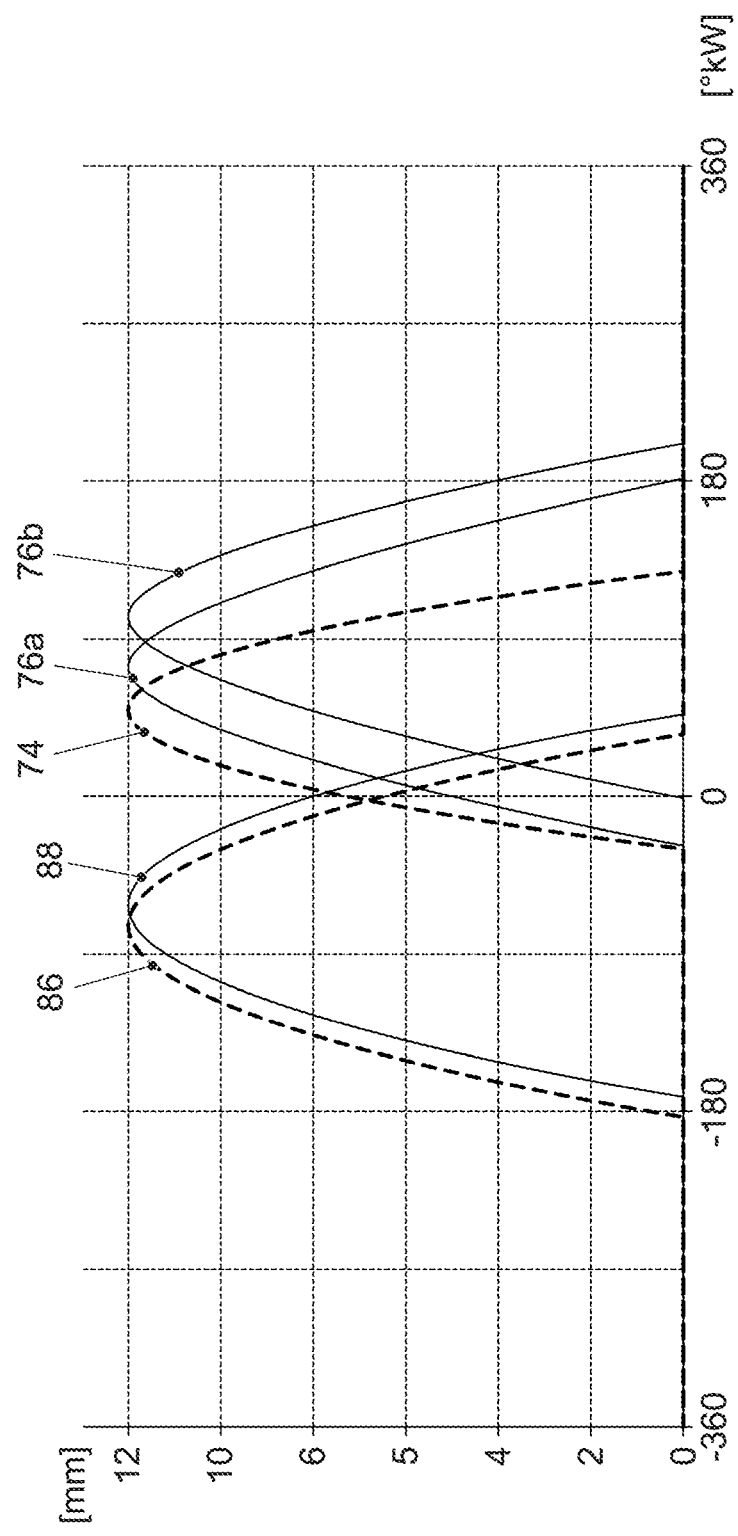
FIG. 6 shows various lift curves for the gas exchange valves of a combustion motor according to FIG. 2.

The effect of the increase in volumetric efficiency is relatively strongly pronounced for reasons including the fact that provision is made for the internal combustion engine that when the engine is operated in a full operation that precedes a switchover into partial operation, it is operated in a so-called Miller cycle, in which provision is made according to the present exemplary embodiment to close the intake valves 28 relatively early and accordingly significantly (for example approximately 60°) before BDC, which causes an incomplete charging of the combustion chambers to occur. This is shown in FIG. 6 by means of the lift curve 74 (first valve lifting curve) provided for all intake valves 28 in full operation of the internal combustion engine. After a switchover into partial operation, for which purpose not only the cams 60, 62 associated with the gas exchange valves 28, 30 of the combustion chambers 22 to be deactivated are changed (each to a null cam), but also (at least some of) the cams 60, 62 associated with the gas exchange valves 28, 30 of the combustion chambers 22 that are to continue to be actively operated are changed, the intake valves 28 of these combustion chambers 22 that are to continue to be actively operated then no longer close relatively early, but instead in the vicinity of, and specifically a few degrees after, BDC with regard to a maximization of the volumetric efficiency, as is illustrated by means of the lift curve 76*a* (second valve lifting curve) shown in FIG. 6.

Figure 7:
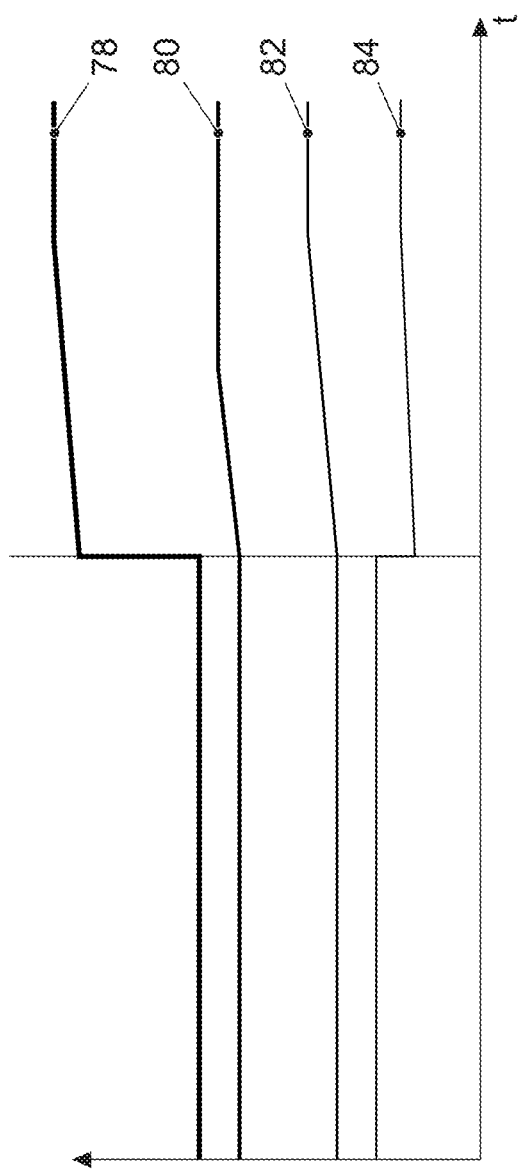
FIG. 7 shows in a diagram, the quantitative behaviors of various operating parameters of an internal combustion engine from FIG. 1 before and after a switchover from a full operation to a partial operation.

FIG. 7 shows in summarized form the measures that are provided in order to realize a switchover of the internal combustion engine from a full operation to a partial operation in as torque-neutral a manner as possible, and consequently with no perceptible brief reduction in the drive power produced by the internal combustion engine (jerking of the drive).

The diagram from FIG. 7 qualitatively shows the behavior, over the time t (horizontal axis), of various operating parameters of the internal combustion engine, specifically the closing time provided for the intake valves 28 of those combustion chambers 22 that are actively operated even in partial operation (curve 78), the closing time provided for the exhaust valves 30 of the same cylinders 16 (curve 80), the pressure in the intake manifold (curve 82), and the ignition angle (curve 84). The diagram is divided by a vertical line; its left-hand half shows the relevant operating parameters for full operation of the internal combustion engine, while the right-hand half shows the behavior of the operating parameters during an initial phase of partial operation. The location of the vertical line thus corresponds to the switchover time or the switchover process, which is carried out relatively rapidly, namely within one revolution of the camshaft 40, and takes effect within one revolution of the crankshaft 34.

In the same short time period, the increase in volumetric efficiency also takes effect that is achieved by the switchover between the two cams 60, 62 that differ with regard to the valve lifting curves, and thus timing, they bring about, and by means of which the intake valves 28 of the combustion chambers 22 that are to continue to be actively operated can be actuated, whereas the effect of the increase in the pressure in the intake manifold 18 rises only relatively slowly to an intended level.

This delayed effect of the increase in the pressure in the intake manifold 18 is offset by the rapidly acting increase in volumetric efficiency in that a lift curve provided with regard to a maximum possible volumetric efficiency is initially provided, by means of the (second) cam 62 provided for this purpose, for the intake valves 28 associated with the combustion chambers 22 that are to continue to be actively operated even in partial operation. However, this lift curve is moved further in the late direction immediately after the switchover by means of the internal combustion engine's phase shifter 54 associated with the intake camshaft 40. This takes place approximately until the pressure in the intake manifold 18 has reached the intended value (see lift curve 76*b* in FIG. 6).

It can also be seen that the second valve lifting curve (lift curves 76*a*, 76*b*) brought about by the second cams 62 is wider than the first valve lifting curve (lift curve 74) brought about by the first cams 60; this serves to achieve an essentially identical opening time in comparison with the first valve lifting curve (lift curve 74) despite the delay of the closing time of the second valve lifting curve according to the lift curve 76*a*.

FIG. 7 also shows that provision is made to set the ignition angle (see curve 84) for the combustion chambers 22 relatively late prior to the switchover in order to achieve a desired torque adjustment and, in particular, torque reduction (as a result of a diminished efficiency) in preparation for the switchover. Simultaneously with the switchover from the first operating state to the second operating state, the ignition angle, which was previously set relatively late, is abruptly adjusted in the early direction so that a maximization of not only the volumetric efficiency but also of the efficiency is achieved immediately upon the switchover, in each case with the goal of a switchover that is as torque-neutral as possible.

Because the lift curve 76a—which is designed with respect to maximum volumetric efficiency—for the intake valves 28 of the combustion chambers 22 that continue to be actively operated in partial operation would lead to a sharply increased tendency to knock in the absence of countermeasures, provision is made according to FIG. 7 (see curve 84) that the ignition angle is adjusted back a bit in the late direction after the switchover (less than was provided prior to the switchover) in order to counteract such an increase in the tendency to knock.

It is additionally shown in FIG. 7 (see curve 80) that an adjustment in the late direction of the closure of the exhaust valves 30 associated with the combustion chambers 22 that continue to be actively operated in partial operation is accomplished by the phase shifter 54 associated with the exhaust camshaft 40 at the same time as the switchover from full operation to partial operation, by which means an adjustment of the valve overlaps of the intake valves 28 and the exhaust valves 30 that is as optimal as possible can be achieved. FIG. 6 also shows the corresponding lift curve 86 in this regard, such as is provided for the exhaust valves 30 in full operation before the switchover as well as the lift curve 88 such as is provided after an end of influencing by the phase shifter 54 in partial operation for the exhaust valves 30 that are then still actuated.

Because a delay of the timing of the exhaust valves 30 of the combustion chambers 22 that continue to be actively operated in partial operation by means of the phase shifter 54 is provided in the exemplary embodiment, provision can be made that no switchability by means of the switchover device 58 is provided for these. With regard to the exhaust camshaft 40, the switchability for an actuation by means of two cams 60, 62 can accordingly be limited to the particular exhaust valves 30 that are no longer actuated in a partial operation of the internal combustion engine. Alternatively, however, two cams 60, 62 that have identical cam tracks can also be provided for the exhaust valves 30 that are also to be actuated in partial operation, so that the switchover for the actuation of the exhaust valves 30 associated with them remains without effect.

Figure 8:
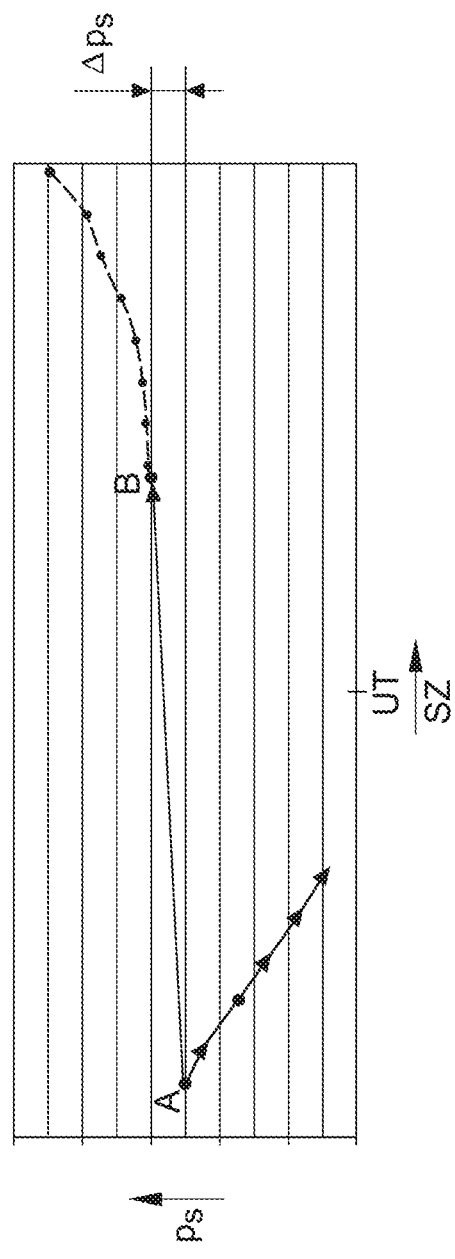
FIG. 8 shows a graph showing the ratios between the closing time SZ of the intake valves and the intake manifold pressure $p_s$, which in each case result in the attainment of a defined torque that should be produced by the combustion motor, for an exemplary full Miller cycle (solid line) and, on the other hand, a partial Atkinson cycle (dashed line).

The graph from FIG. 8 illustrates once more the advantage that can be achieved by the method according to the invention. Shown there for an exemplary full Miller cycle (solid line), on the one hand, and a partial Atkinson cycle (dashed line), on the other hand, are the ratios between the closing time SZ of the intake valves 28 and the intake manifold pressure $p_s$, which in each case result in the attainment of a defined torque that should be produced by the combustion motor 10. It can be seen that the more distant from BDC the closing times SZ are, the higher the intake manifold pressure $p_s$ must be in each case.

For a switchover from full operation to partial operation, provision can now be made that the combustion motor 10 is operated in a full Miller cycle immediately prior to the switchover, wherein an earliest possible closure of the intake valves 28 is provided by means of the phase shifter (see point A in FIG. 8). The intake manifold pressure $p_s$ required here is at a maximum when the torque to be achieved is taken into account. Through a changeover of the cams 60, 62 by which the intake valves 28 that are associated with the combustion chambers 22 that are also to be operated in partial operation, it is possible to briefly switch over to a partial operation in which the closing times SZ of these intake valves 28 are designed with regard to a volumetric efficiency that is as great as possible (see point B in FIG. 8). As a result of this maximized volumetric efficiency, the difference $\Delta p_s$ between the required intake manifold pressure $p_s$ at point B and that at point A is as small as possible, by which means a delay in the ignition timing initiated for torque adjustment prior to a switchover of the valve lifting curves can likewise be kept to a minimum as a result. This has a corresponding positive effect on the efficiency of the operation of the combustion motor 10.

Provision is made according to the invention that the timing, and thus also the closing times SZ of the intake valves 28 considered here, are moved further in the late direction by means of the phase shifter 54 immediately following the changeover of the cams 60, 62, thus realizing a partial Atkinson cycle of the combustion motor 10. This is easily possible starting from the (end) position of the phase shifter 54 that the latter had adopted in the full Miller cycle prior to the switchover because an adjustment of the phase shifter 54 in the direction of the other end position of the phase shifter 54 starting from the previously set end position is provided for this purpose.

After the switchover, as a result of the increasing delay of the closing times SZ of the intake valves 28 considered here, the volumetric efficiency that was initially maximized by the changeover of the cams 60, 62 is decreased (which is desired for avoiding knocking or for minimizing a knock-preventing delay of the ignition timing). This presupposes an increase in the intake manifold pressure $p_s$ simultaneous with the delay of the closing time SZ in order to keep constant the torque produced by the combustion motor 10. This is ensured by an increase in the intake manifold pressure $p_s$ that is accomplished in parallel with the delay by means of the measures already described.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an internal combustion engine comprising a combustion motor that forms at least two combustion chambers, which are delimited by cylinders formed in a cylinder housing and by pistons that are guided therein, and in which thermodynamic cycles are performed during operation of the internal combustion engine, wherein a gas exchange in the combustion chambers is then controlled by at least one intake valve and at least one exhaust valve, the method comprising:
providing a first operating state in which the thermodynamic cycles are performed in a first combustion chamber as well as in a second combustion chamber;
providing a second operating state in which the thermodynamic cycles are performed in the first combustion chamber and the thermodynamic cycles are not performed in the second combustion chamber;

performing, for a switchover from the first operating state to the second operating state, a change from a use of a first valve lifting curve to a use of a second valve lifting curve for actuation of the intake valve associated with the first combustion chamber;

closing at least the intake valve associated with the first combustion chamber before or after BDC in the case of an actuation according to the first valve lifting curve and closer to BDC in the case of an actuation according to the second valve lifting curve; and adjusting, after the switchover from the first operating state to the second operating state, a timing for the intake valve associated with the first combustion chamber via a phase shifter in a late direction if an intake closure before BDC was provided for the first operating state or in an early direction if an intake closure after BDC was provided for the first operating state.

2. The method according to claim 1, wherein the first valve lifting curve is applied to the intake valve via a first intake cam and the second valve lifting curve is applied via a second intake cam.

3. The method according to claim 1, wherein at least the intake valve associated with the first combustion chamber is closed before BDC−60° crankshaft angle or after BDC+100° crankshaft angle in the case of actuation in accordance with the first valve lifting curve, and/or in the range between BDC±45° crankshaft angle in the case of actuation in accordance with the second valve lifting curve.

4. The method according to claim 1, wherein a width of the second valve lifting curve as compared to a width of the first valve lifting curve is greater if an intake closure before BDC was provided for the first operating state, or is smaller if an intake closure after BDC was provided for the first operating state.

5. The method according to claim 1, wherein at least the intake valve associated with the first combustion chamber is adjusted further in the late direction to at least BDC+25° crankshaft angle if an intake closure before BDC was provided for the first operating state, or is adjusted further in the early direction to at least BDC−20° crankshaft angle if an intake closure after BDC was provided for the first operating state.

6. The method according to claim 1, wherein a valve overlap of the intake and/or exhaust valves associated with the first combustion chamber is adjusted for a switchover from the first operating state to the second operating state.

7. The method according to claim 6, wherein a change is made from a use of a first exhaust cam to the use of a second exhaust cam for the actuation of the exhaust valve associated with the first combustion chamber.

8. The method according to claim 7, wherein, as compared to the first exhaust cam, the second exhaust cam causes a relatively late exhaust closure when an intake closure before BDC was provided for the first operating state, or causes a relatively early exhaust closure when an intake closure after BDC was provided for the first operating state.

9. The method according to claim 1, wherein the pressure in an intake manifold of the internal combustion engine is increased after the switchover from the first operating state to the second operating state.

10. The method according to claim 1, wherein an ignition angle for the first combustion chamber that was previously set relatively late is adjusted in the early direction for the switchover from the first operating state to the second operating state.

11. The method according to claim 10, wherein the ignition angle is adjusted back in the late direction subsequent to the early adjustment.

12. An internal combustion engine comprising:
a combustion motor that forms at least two combustion chambers, which are delimited by cylinders formed in a cylinder housing and by pistons that are guided therein, and in which thermodynamic cycles are performed during operation of the internal combustion engine, wherein a gas exchange in the combustion chambers is controlled via an intake valve and an exhaust valve; and
a switchover device to switch use between two valve lifting curves;
a phase shifter for the intake valve associated with a first combustion chamber;
a control device that is programmed such that it performs the method according to claim 1.

13. The internal combustion engine according to claim 12, further comprising:
two exhaust cams for the exhaust valve and/or intake valve associated with the first combustion chamber and/or the second combustion chamber, it being possible to switch between their use via the switchover device, and/or
a component to influence the pressure in an intake manifold of the internal combustion engine, and/or
a phase shifter for changing the timing, including for the intake valve associated with the second combustion chamber, and/or for changing the timing for the exhaust valve associated with the first combustion chamber and/or the second combustion chamber.

* * * * *